United States Patent
Muthukkaruppan et al.

(10) Patent No.: US 10,120,577 B2
(45) Date of Patent: *Nov. 6, 2018

(54) METHOD AND SYSTEM FOR IMPLEMENTING PERFORMANCE TIER DE-DUPLICATION IN A VIRTUALIZATION ENVIRONMENT

(71) Applicant: Nutanix, Inc., San Jose, CA (US)

(72) Inventors: Kannan Muthukkaruppan, Union City, CA (US); Karthik Ranganathan, Fremont, CA (US)

(*) Notice: Subject to any disclaimer, the term of this patent is extended or adjusted under 35 U.S.C. 154(b) by 196 days.

This patent is subject to a terminal disclaimer.

(21) Appl. No.: 15/154,835

(22) Filed: May 13, 2016

(65) Prior Publication Data
US 2016/0378355 A1 Dec. 29, 2016

Related U.S. Application Data

(63) Continuation of application No. 14/466,782, filed on Aug. 22, 2014, now Pat. No. 9,342,253.

(60) Provisional application No. 61/869,633, filed on Aug. 23, 2013.

(51) Int. Cl.
*G06F 3/06* (2006.01)
*G06F 9/455* (2018.01)
*G06F 12/0813* (2016.01)

(52) U.S. Cl.
CPC ............ *G06F 3/0608* (2013.01); *G06F 3/061* (2013.01); *G06F 3/067* (2013.01); *G06F 3/0641* (2013.01);

(Continued)

(58) Field of Classification Search
CPC ...... G06F 3/0608; G06F 3/061; G06F 3/0641; G06F 3/0659; G06F 3/0664; G06F 3/067;

(Continued)

(56) References Cited

U.S. PATENT DOCUMENTS 8,060,715 B2 * 11/2011 Cremelie .......... G06F 17/30159
711/118
8,285,690 B2 * 10/2012 Nakamura ............ G06F 3/0608
707/692

(Continued)

OTHER PUBLICATIONS

Notice of Allowance dated Jan. 13, 2016 for corresponding U.S. Pat. No. 9,342,253.

*Primary Examiner* — Reginald G Bragdon
*Assistant Examiner* — Kimbleann C Verdi

(57) ABSTRACT

The present application provides an improved approach for managing performance tier de-duplication in a virtualization environment. A content cache is implemented on high performance tiers of storage in order to maintain a working set for the user virtual machines accessing the system, and associates fingerprints with data stored therein. During write requests from the user virtual machines, fingerprints are calculated for the data to be written. However, no de-duplication is performed during the write. During read requests, fingerprints corresponding to the data to be read are retrieved and matched with the fingerprints associated with the data in the content cache. Thus, while multiple pieces of data having the same fingerprints may be written to the lower performance tiers of storage, only one of those pieces of data having that fingerprint will be stored in the content cache for fulfilling read requests.

21 Claims, 14 Drawing Sheets

(52) U.S. Cl.
CPC .......... *G06F 3/0659* (2013.01); *G06F 3/0664* (2013.01); *G06F 3/0685* (2013.01); *G06F 9/45558* (2013.01); *G06F 12/0813* (2013.01); *G06F 2003/0694* (2013.01); *G06F 2009/45583* (2013.01); *G06F 2212/1016* (2013.01); *G06F 2212/1044* (2013.01); *G06F 2212/151* (2013.01); *G06F 2212/154* (2013.01); *G06F 2212/6042* (2013.01)

(58) Field of Classification Search
CPC . G06F 3/0685; G06F 9/45558; G06F 12/0813
USPC ........ 711/103, 118, 136, 156; 707/639, 649, 707/664, 692, 698; 718/1; 365/185.33
See application file for complete search history.

(56) References Cited

U.S. PATENT DOCUMENTS

| | | | | |
|---|---|---|---|---|
| 8,407,186 B1* | 3/2013 | Cremelie | .............. | G06F 3/0641 707/637 |
| 8,589,640 B2* | 11/2013 | Colgrove | .......... | G06F 17/30159 707/692 |
| 8,793,227 B2* | 7/2014 | Nakamura | ............ | G06F 3/0608 707/692 |
| 8,930,307 B2* | 1/2015 | Colgrove | .......... | G06F 17/30159 707/610 |
| 8,930,648 B1* | 1/2015 | Storer | ................. | G06F 12/0292 711/154 |
| 9,043,555 B1* | 5/2015 | Khona | .................. | G06F 3/0683 711/118 |
| 9,152,333 B1* | 10/2015 | Johnston | ............... | G06F 3/0641 |
| 9,189,421 B2* | 11/2015 | Testardi | .............. | G06F 11/1453 |
| 2011/0191522 A1* | 8/2011 | Condict | ................ | G06F 12/123 711/103 |
| 2012/0239871 A1* | 9/2012 | Badam | ................ | G06F 12/0246 711/104 |
| 2013/0318051 A1* | 11/2013 | Kumar | ............. | G06F 17/30156 707/692 |
| 2014/0115182 A1* | 4/2014 | Sabaa | ................ | H04L 67/1097 709/232 |

* cited by examiner

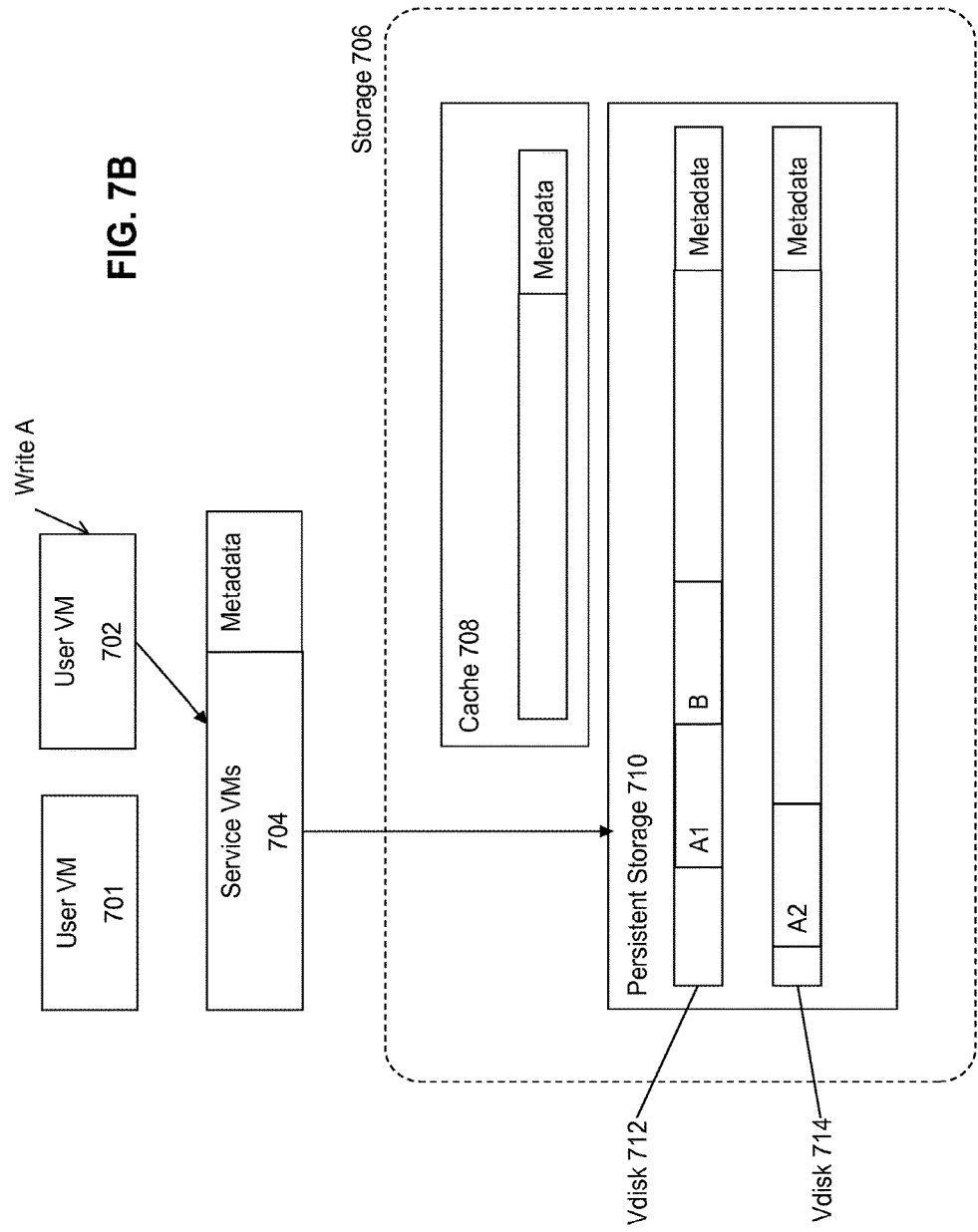

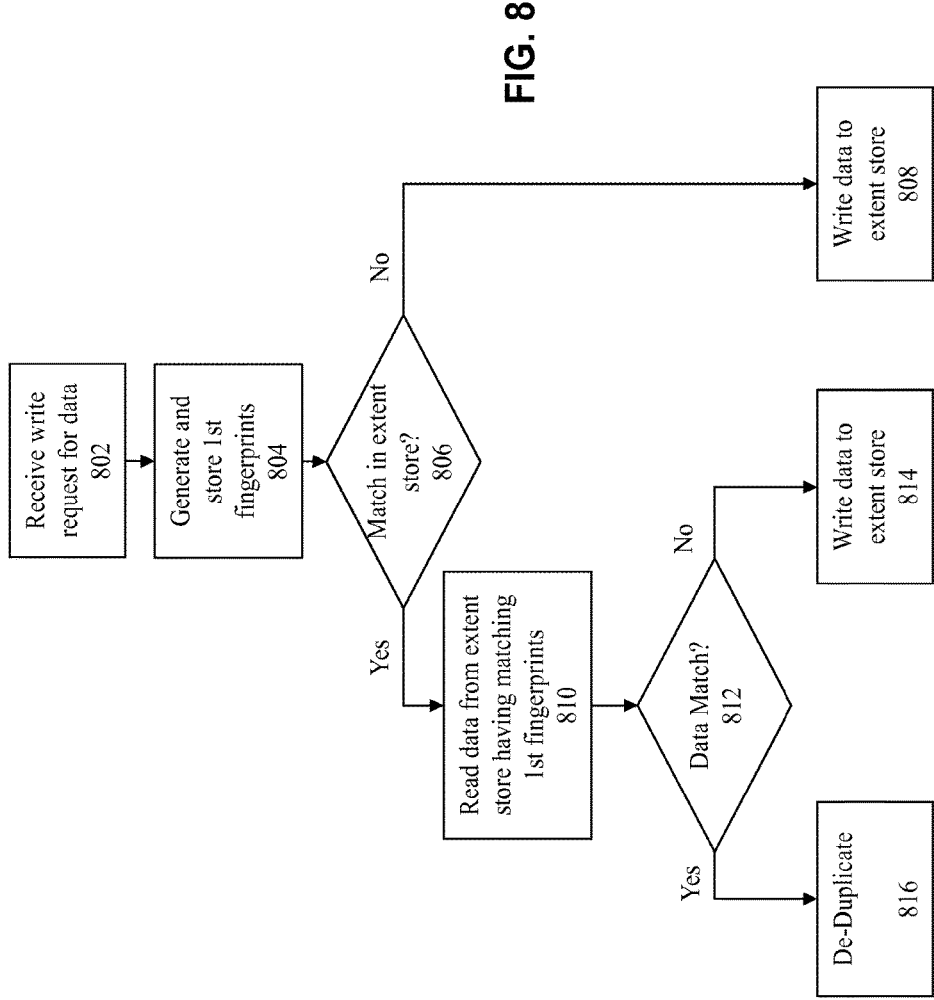

METHOD AND SYSTEM FOR IMPLEMENTING PERFORMANCE TIER DE-DUPLICATION IN A VIRTUALIZATION ENVIRONMENT

CROSS REFERENCE TO RELATED APPLICATIONS

The present application is a continuation of U.S. patent application Ser. No. 14/466,782, filed on Aug. 22, 2014, entitled "METHOD AND SYSTEM FOR IMPLEMENTING PERFORMANCE TIER DE-DUPLICATION IN A VIRTUALIZATION ENVIRONMENT," issued as U.S. Pat. No. 9,342,253 on May 17, 2016, which is hereby incorporated by reference in its entirety.

The present application is related to U.S. Pat. No. 8,601,473, issued on Dec. 3, 2013, entitled "ARCHITECTURE FOR MANAGING I/O AND STORAGE FOR A VIRTUALIZATION ENVIRONMENT", U.S. Pat. No. 8,850,130, issued on Sep. 30, 2014, entitled "METADATA FOR MANAGING I/O AND STORAGE FOR A VIRTUALIZATION ENVIRONMENT", U.S. Pat. No. 8,549,518, issued on Oct. 1, 2013, entitled "METHOD AND SYSTEM FOR IMPLEMENTING A MAINTENANCE SERVICE FOR MANAGING I/O AND STORAGE FOR A VIRTUALIZATION ENVIRONMENT", U.S. Pat. No. 9,009,106, issued on Apr. 14, 2015, entitled "METHOD AND SYSTEM FOR IMPLEMENTING WRITABLE SNAPSHOTS IN A VIRTUALIZED STORAGE ENVIRONMENT", and U.S. patent application Ser. No. 13/207,375, entitled "METHOD AND SYSTEM FOR IMPLEMENTING A FAST CONVOLUTION FOR COMPUTING APPLICATIONS",filed on Aug. 10, 2011, and which are all hereby incorporated by reference in their entireties.

FIELD

This disclosure concerns an architecture for performing performance tier de-duplication in a virtualization environment.

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Data Centers are often architected as diskless computers ("application servers") that communicate with a set of networked storage appliances ("storage servers") via a network, such as a Fiber Channel or Ethernet network. A storage server exposes volumes that are mounted by the application servers for their storage needs. If the storage server is a block-based server, it exposes a set of volumes that are also called Logical Unit Numbers (LUNs). If, on the other hand, a storage server is file-based, it exposes a set of volumes that are also called file systems. Either way, a volume is the smallest unit of administration for a storage device, e.g., a storage administrator can set policies to backup, snapshot, RAID-protect, or WAN-replicate a volume, but cannot do the same operations on a region of the LUN, or on a specific file in a file system.

Storage devices comprise one type of physical resources that can be managed and utilized in a virtualization environment. For example, VMWare is a company that provides products to implement virtualization, in which networked storage devices are managed by the VMWare virtualization software to provide the underlying storage infrastructure for the VMs in the computing environment. The VMWare approach implements a file system (VMFS) that exposes storage hardware to the VMs. The VMWare approach uses VMDK "files" to represent virtual disks that can be accessed by the VMs in the system. Effectively, a single volume can be accessed and shared among multiple VMs.

While this known approach does allow multiple VMs to perform I/O activities upon shared networked storage, there are also numerous drawbacks and inefficiencies with this approach. For example, because the VMWare approach is reliant upon the VMFS file system, administration of the storage units occurs at a too-broad level of granularity. While the virtualization administrator needs to manage VMs, the storage administrator is forced to manage coarse-grained volumes that are shared by multiple VMs. Configurations such as backup and snapshot frequencies, RAID properties, replication policies, performance and reliability guarantees etc. continue to be at a volume level, and that is problematic. Moreover, this conventional approach does not allow for certain storage-related optimizations to occur in the primary storage path.

For example, when multiple VMs perform I/O activities upon shared network storage, it is often desirable to de-duplicate the data. In some types of de-duplication, the goal is to minimize the number of copies that a given data item is stored in the storage system. In some systems, the storage systems accessed by the VMs may be divided into multiple tiers. In order to reduce I/O costs, higher performance tiers may be used to store a hot working set of data to be accessed by multiple VMs performing I/O activities. Because dozens or even hundreds of user VMs may be supported on a single node, without de-duplication, it is often impossible to effectively fit the working set within the high performance tiers.

Therefore, there is a need for an improved approach to implement performance tier de-duplication to maintain a de-duplicated working set in the high performance storage tiers.

SUMMARY

Embodiments of the present invention provide an architecture for managing performance tier de-duplication in a virtualization environment. According to some embodiments, a content cache is implemented on high performance tiers of storage, such as in RAM and/or flash, in order to maintain a working set for the user virtual machines accessing the system. The content cache associates fingerprints (such as SHA1) to data chunks stored in the content cache. In some embodiments, the content cache may contain a plurality of LRU (least recently used) chains, such as a single-touch LRU chain, multi-touch LRU chain, and flash LRU chain.

During write requests from the user virtual machines, fingerprints are calculated for the data to be written. The fingerprints are stored in metadata, and are associated with the vDisk location of the data. In some embodiments, in order to increase write speed, no de-duplication is performed during the write.

During read requests, fingerprints for data at the vDisk location to be read are retrieved and matched with the fingerprints associated with the data chunks in the content cache. If there is a match, the data is retrieved from the content cache. If there is no match, the data is instead retrieved from storage, after which the data and associated fingerprints may also be written into the content cache. In this way, while multiple pieces of data at different vDisk locations having the same fingerprints may be written to the lower performance or persistent tiers of storage, only one of those pieces of data having that fingerprint will be stored in the content cache for fulfilling read requests. Thus, data in the content cache may match fingerprints for data at different vDisk addresses requested by different user VMs.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIGS. 7A-7D illustrate a process of performing performance-tier de-duplication in accordance with some embodiments.

FIG. 8 illustrates a method for performing de-duplication using multiple fingerprint types.

DETAILED DESCRIPTION OF THE EMBODIMENTS OF THE INVENTION

Embodiments of the present invention provide an improved approach to implement performance tier de-duplication in a virtualization environment. According to some embodiments, storage for a plurality of VMs is divided into a plurality of storage tiers (e.g., spinning disk tier, flash tier, SSD tier, RAM tier, etc.). In some embodiments, one or more high performance tiers (typically characterized by faster or more efficient I/O performance) may be used to implement a content cache for storing a hot working set for the plurality of VMs. On the other hand, other tiers, typically lower performance tiers such as a spinning disk tier, may be used for persistent storage of data for the plurality of VMs.

The content cache associates fingerprints with data stored in the content cache, allowing for de-duplication during read operations requesting data stored in the content cache. According to some embodiments, fingerprints are computed for data during write operations, while de-duplication occurs in the content cache on read operations. This ensures de-duplication for data stored in the content cache, while data in the storage tiers is not de-duplicated.

Thus, while multiple pieces of data with the same fingerprints may be written to the lower performance or persistent tiers of storage, only one copy of the data having that particular fingerprint will be stored in the content cache for fulfilling read requests. This allows for a single piece of data in the content cache to be returned for different requests for data at different vDisk addresses by different user VMs, where the different data requested have the same fingerprint as the single piece of data in the content cache. In addition, fingerprints for each piece of written data only need to be calculated once during write operations, which are then stored in metadata for use in subsequent read operations.

Figure 1:
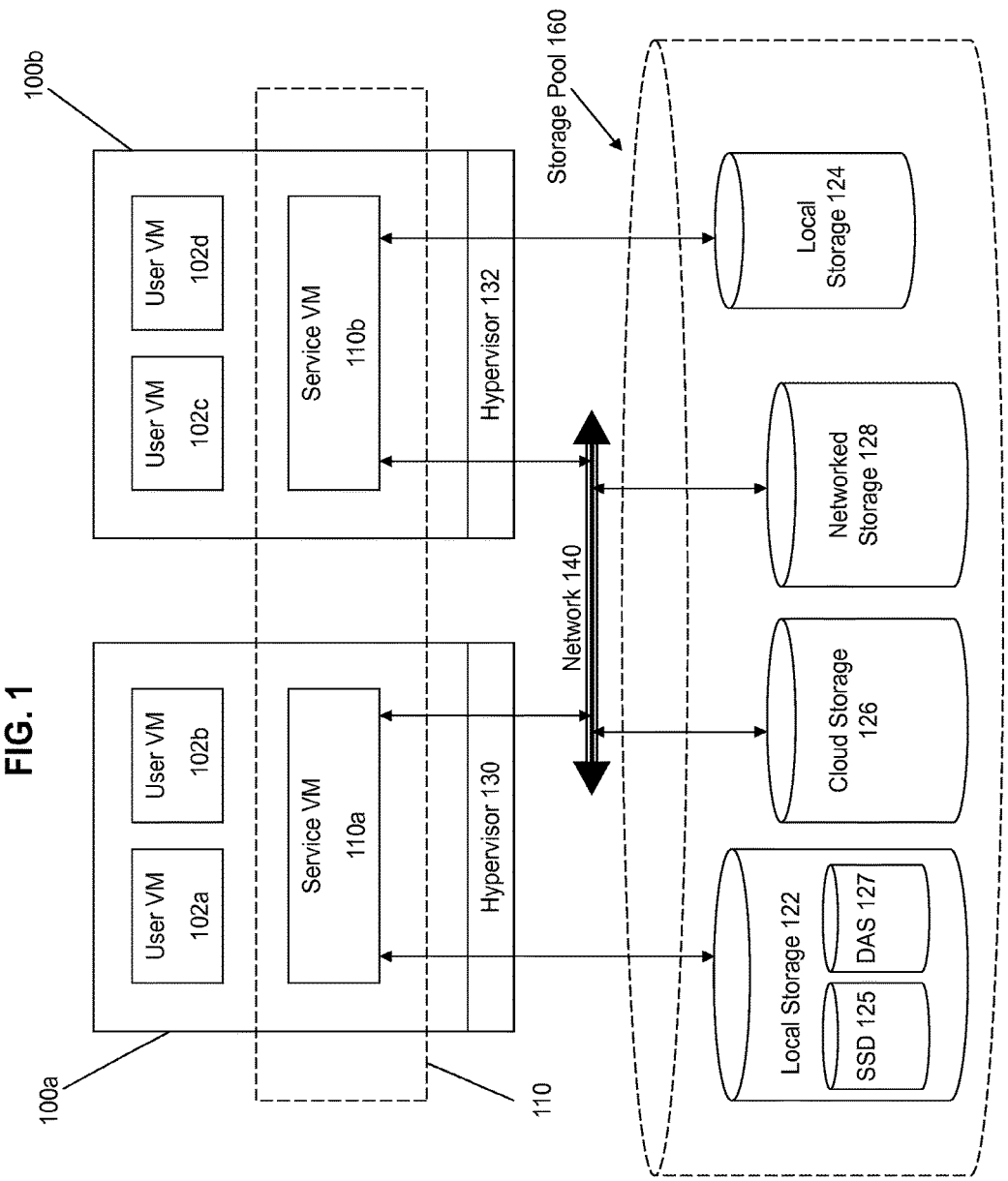
FIG. 1 illustrates an example architecture to implement I/O and storage device management in a virtualization environment according to some embodiments.

FIG. 1 illustrates an architecture for implementing storage management in a virtualization environment according to some embodiments. The architecture of FIG. 1 can be implemented for a distributed platform that contains multiple servers 100a and 100b that manages multiple tiers of storage. The multiple tiers of storage may include storage that is accessible through a network 140, such as cloud storage 126 or networked storage 128 (e.g., a SAN or "storage area network"). Unlike the prior art, the present embodiment also permits local storage 122/124 that is within or directly attached to the server and/or appliance to be managed as part of the storage pool 160. Examples of such storage include Solid State Drives (henceforth "SSDs") 125 or Hard Disk Drives (henceforth "HDDs" or "spindle drives") 127. These collected storage devices, both local and networked, form a storage pool 160. Virtual disks (or "vDisks") can be structured from the storage devices in the storage pool 160, as described in more detail below. As used herein, the term vDisk refers to the storage abstraction that is exposed by a Service VM to be used by a user VM. In some embodiments, the vDisk is exposed via iSCSI ("internet small computer system interface") or NFS ("network file system") and is mounted as a virtual disk on the user VM.

Each server 100a or 100b runs virtualization software, such as VMware ESX(i), Microsoft Hyper-V, or RedHat KVM. The virtualization software includes a hypervisor 130/132 to manage the interactions between the underlying hardware and the one or more user VMs 102a, 102b, 102c, and 102d that run client software.

A special VM 110a/110b is used to manage storage and I/O activities according to some embodiment of the invention, which is referred to herein as a "Service VM". This is the "Storage Controller" in the currently described architecture. Multiple such storage controllers coordinate within a cluster to form a single-system. The Service VMs 110a/110b are not formed as part of specific implementations of hypervisors 130/132. Instead, the Service VMs run as virtual machines above hypervisors 130/132 on the various servers 102a and 102b, and work together to form a distributed system 110 that manages all the storage resources, including the locally attached storage 122/124, the networked storage 128, and the cloud storage 126. Since the Service VMs run above the hypervisors 130/132, this means that the current approach can be used and implemented within any virtual machine architecture, since the Service VMs of embodiments of the invention can be used in conjunction with any hypervisor from any virtualization vendor.

Each Service VM 110a-b exports one or more block devices or NFS server targets that appear as disks to the client VMs 102a-d. These disks are virtual, since they are implemented by the software running inside the Service VMs 110a-b. Thus, to the user VMs 102a-d, the Service VMs 110a-b appear to be exporting a clustered storage appliance that contains some disks. All user data (including the operating system) in the client VMs 102a-d resides on these virtual disks.

Significant performance advantages can be gained by allowing the virtualization system to access and utilize local (e.g., server-internal) storage 122 as disclosed herein. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125.

Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 122. On the other hand, data that does not require fast access or which is accessed infrequently can be stored in the networked storage devices 128 or in cloud storage 126.

Another advantage provided by this approach is that administration activities can be handled on a much more efficient granular level. Recall that the prior art approaches of using a legacy storage appliance in conjunction with VMFS heavily relies on what the hypervisor can do at its own layer with individual "virtual hard disk" files, effectively making all storage array capabilities meaningless. This is because the storage array manages much coarser grained volumes while the hypervisor needs to manage finer-grained virtual disks. In contrast, the present embodiment can be used to implement administrative tasks at much smaller levels of granularity, one in which the smallest unit of administration at the hypervisor matches exactly with that of the storage tier itself.

Yet another advantage of the present embodiment of the invention is that storage-related optimizations for access and storage of data can be implemented directly within the primary storage path. For example, in some embodiments of the invention, the Service VM 110a can directly perform data de-duplication tasks when storing data within the storage devices. This is far advantageous to prior art approaches that require add-on vendors/products outside of the primary storage path to provide de-duplication functionality for a storage system. Other examples of optimizations that can be provided by the Service VMs include quality of service (QOS) functions, encryption, and compression. The new architecture massively parallelizes storage, by placing a storage controller—in the form of a Service VM—at each hypervisor, and thus makes it possible to render enough CPU and memory resources to achieve the aforementioned optimizations.

Figure 2:
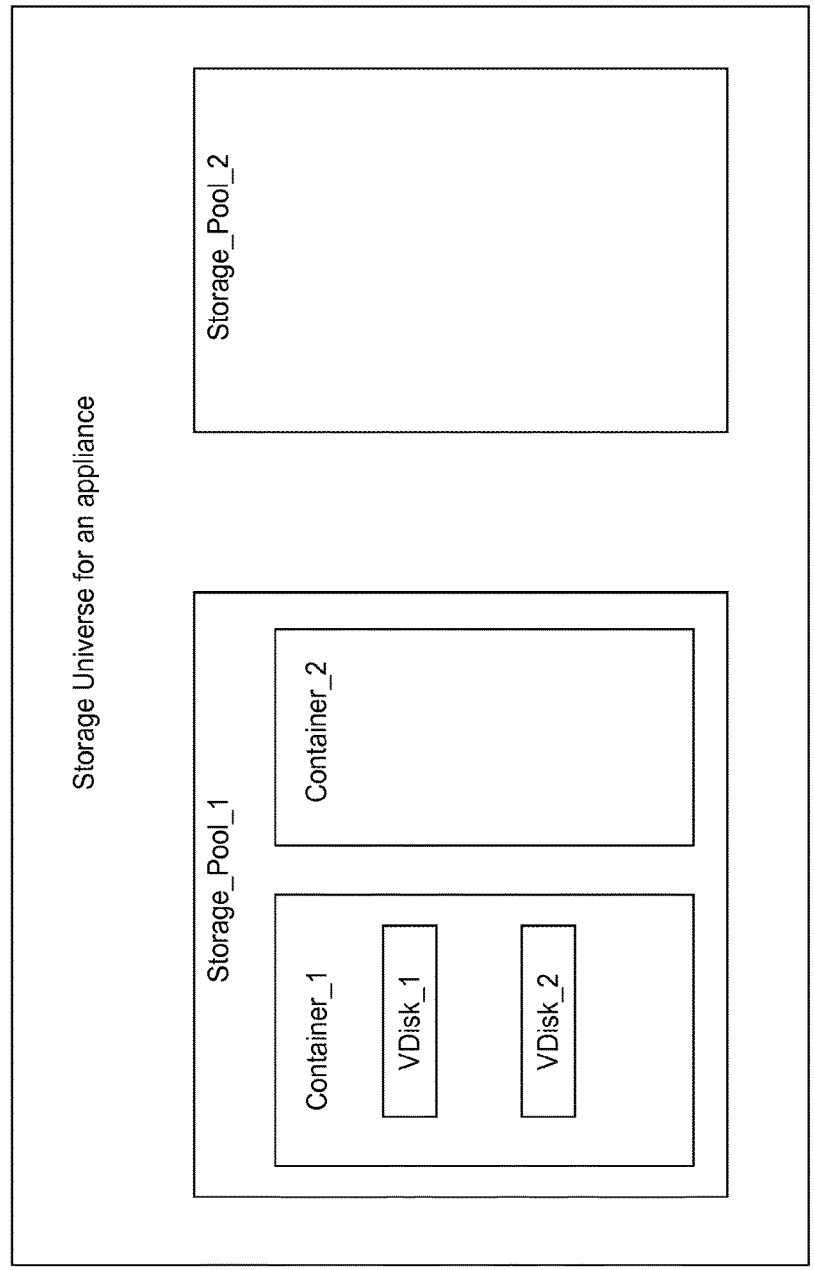
FIG. 2 illustrates a storage hierarchy according to some embodiments.

For easy management of the appliance, the storage is divided up into abstractions that have a hierarchical relationship to each other. FIG. 2 illustrates the storage hierarchy of the storage objects according to some embodiments of the invention, where all storage in the storage appliance collectively forms a Storage Universe. These storage devices may encompass any suitable devices, such as SSDs, HDDs on the various servers ("server-internal" or local storage), SAN, and Cloud storage.

Storage with similar characteristics is classified into tiers. For example, in some embodiments all SSDs can be classified into a first tier and all HDDs may be classified into another tier, etc. In a heterogeneous system with different kinds of HDDs, one may classify the disks into multiple HDD tiers. This action may similarly be taken for SAN and cloud storage.

The storage universe may be divided up into storage pools—essentially a collection of specific storage devices. An administrator may be responsible for deciding how to divide up the storage universe into storage pools. For example, an administrator may decide to just make one storage pool with all the disks in the storage universe in that pool. However, the principal idea behind dividing up the storage universe is to provide mutual exclusion—fault isolation, performance isolation, administrative autonomy—when accessing the disk resources.

This may be one approach that can be taken to implement QoS techniques. For example, one rogue user may result in an excessive number of random IO activity on a hard disk—thus if other users are doing sequential IO, they still might get hurt by the rogue user. Enforcing exclusion (isolation) through storage pools might be used to provide hard guarantees for premium users. Another reason to use a storage pool might be to reserve some disks for later use (field replaceable units, or "FRUs").

As noted above, the Service VM is the primary software component within the server that virtualizes I/O access to hardware resources within a storage pool according to embodiments of the invention. This approach essentially provides for a separate and dedicated controller for each and every node within a virtualized data center (a cluster of nodes that run some flavor of hypervisor virtualization software), since each node will include its own Service VM. This is in contrast to conventional storage architectures that provide for a limited number of storage controllers (e.g., four controllers) to handle the storage workload for the entire system, and hence results in significant performance bottlenecks due to the limited number of controllers. Unlike the conventional approaches, each new node will include a Service VM to share in the overall workload of the system to handle storage tasks. Therefore, the current approach is infinitely scalable, and provides a significant advantage over the conventional approaches that have a limited storage processing power. Consequently, the currently described approach creates a massively-parallel storage architecture that scales as and when hypervisor hosts are added to a datacenter.

Figure 3:
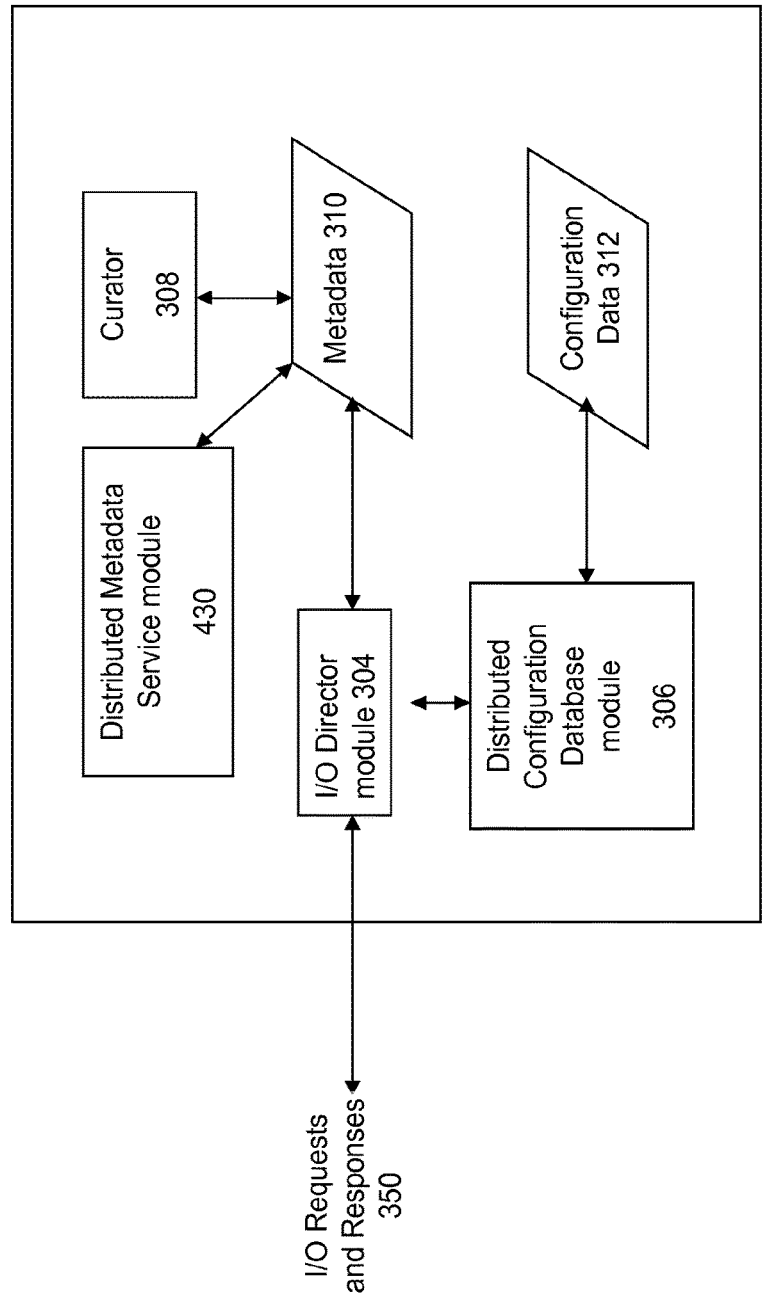
FIG. 3 illustrates the components of a Service VM according to some embodiments.

FIG. 3 illustrates the internal structures of a Service VM according to some embodiments of the invention. As previously noted, the Service VMs are not formed as part of specific implementations of hypervisors. Instead, the Service VMs run as virtual machines above hypervisors on the various nodes. Since the Service VMs run above the hypervisors, this means that the current approach can be used and implemented within any virtual machine architecture, since the Service VMs of embodiments of the invention can be used in conjunction with any hypervisor from any virtualization vendor. Therefore, the Service VM can be configured to operate ubiquitously anywhere within the computing environment, and will not need to be custom-configured for each different type of operating environment. This is particularly useful because the industry-standard iSCSI or NFS protocols allow the Service VM to be hypervisor-agnostic.

The main entry point into the Service VM is the central controller module 304 (which is referred to here as the "I/O Director module 304"). The term I/O Director module is used to connote that fact that this component directs the I/O from the world of virtual disks to the pool of physical storage resources. In some embodiments, the I/O Director module implements the iSCSI or NFS protocol server.

A write request originating at a user VM would be sent to the iSCSI or NFS target inside the service VM's kernel. This write would be intercepted by the I/O Director module 304 running in user space. I/O Director module 304 interprets the iSCSI LUN or the NFS file destination and converts the request into an internal "vDisk" request (e.g., as described in more detail below). Ultimately, the I/O Director module 304 would write the data to the physical storage.

Each vDisk managed by a Service VM corresponds to a virtual address space forming the individual bytes exposed as a disk to user VMs. Thus, if the vDisk is of size 1 TB, the corresponding address space maintained by the invention is 1 TB. This address space is broken up into equal sized units called vDisk blocks. Metadata 310 is maintained by the Service VM to track and handle the vDisks and the data and storage objects in the systems that pertain to the vDisks. The Metadata 310 is used to track and maintain the contents of the vDisks and vDisk blocks.

In order to determine where to write and read data from the storage pool, the I/O Director module 304 communicates with a Distributed Metadata Service module 430 that maintains all the metadata 310. In some embodiments, the Distributed Metadata Service module 430 is a highly available, fault-tolerant distributed service that runs on all the Service VMs in the appliance. The metadata managed by Distributed Metadata Service module 430 is itself kept on the persistent storage attached to the appliance. According to some embodiments of the invention, the Distributed Metadata Service module 430 may be implemented on SSD storage.

Since requests to the Distributed Metadata Service module 430 may be random in nature, SSDs can be used on each server node to maintain the metadata for the Distributed Metadata Service module 430. The Distributed Metadata Service module 430 stores the metadata that helps locate the actual content of each vDisk block. If no information is found in Distributed Metadata Service module 430 corresponding to a vDisk block, then that vDisk block is assumed to be filled with zeros. The data in each vDisk block is physically stored on disk in contiguous units called extents. Extents may vary in size when de-duplication is being used. Otherwise, an extent size coincides with a vDisk block. Several extents are grouped together into a unit called an extent group. An extent group is then stored as a file on disk. In some embodiments, the size of each extent group may be anywhere from 16 MB to 64 MB. In some embodiments, an extent group is the unit of recovery, replication, and many other storage functions within the system.

Further details regarding methods and mechanisms for implementing Metadata 310 are described below and in co-pending application Ser. No. 13/207,357, now issued as U.S. Pat. No. 8,850,130, which is hereby incorporated by reference in its entirety.

A health management module 308 (which may hereinafter be referred to as a "Curator") is employed to address and cure any inconsistencies that may occur with the Metadata 310. The Curator 308 oversees the overall state of the virtual storage system, and takes actions as necessary to manage the health and efficient performance of that system. According to some embodiments of the invention, the curator 308 operates on a distributed basis to manage and perform these functions, where a master curator on a first server node manages the workload that is performed by multiple slave curators on other server nodes. MapReduce operations are performed to implement the curator workload, where the master curator may periodically coordinate scans of the metadata in the system to manage the health of the distributed storage system. Further details regarding methods and mechanisms for implementing Curator 308 are disclosed in co-pending application Ser. No. 13/207,365, now issued as U.S. Pat. No. 8,549,518, which is hereby incorporated by reference in its entirety.

Some of the Service VMs also includes a Distributed Configuration Database module 306 to handle certain administrative tasks. The primary tasks performed by the Distributed Configuration Database module 306 are to maintain configuration data 312 for the Service VM and act as a notification service for all events in the distributed system. Examples of configuration data 312 include, for example, (1) the identity and existence of vDisks; (2) the identity of Service VMs in the system; (3) the physical nodes in the system; and (4) the physical storage devices in the system. For example, assume that there is a desire to add a new physical disk to the storage pool. The Distributed Configuration Database module 306 would be informed of the new physical disk, after which the configuration data 312 is updated to reflect this information so that all other entities in the system can then be made aware for the new physical disk. In a similar way, the addition/deletion of vDisks, VMs and nodes would handled by the Distributed Configuration Database module 306 to update the configuration data 312 so that other entities in the system can be made aware of these configuration changes.

Another task that is handled by the Distributed Configuration Database module 306 is to maintain health information for entities in the system, such as the Service VMs. If a Service VM fails or otherwise becomes unavailable, then this module tracks this health information so that any management tasks required of that failed Service VM can be migrated to another Service VM.

The Distributed Configuration Database module 306 also handles elections and consensus management within the system. Another task handled by the Distributed Configuration Database module is to implement ID creation. Unique IDs are generated by the Distributed Configuration Database module as needed for any required objects in the system, e.g., for vDisks, Service VMs, extent groups, etc. In some embodiments, the IDs generated are 64-bit IDs, although any suitable type of IDs can be generated as appropriate for embodiment so the invention. According to some embodiments of the invention, the Distributed Configuration Database module 306 may be implemented on an SSD storage because of the real-time guarantees required to monitor health events.

Further details regarding methods and mechanisms for implementing I/O requests between user VMs and Service VMs, and for implementing the modules of the Service VM are disclosed in co-pending application Ser. No. 13/207,345, now issued as U.S. Pat. No. 8,601,473, which is hereby incorporated by reference in its entirety.

De-Duplication of Virtualization Environment Data

Some embodiments can be used to directly implement de-duplication when implementing I/O in a virtualization environment. De-duplication refers to the process of making sure that a specific data item is not excessively duplicated multiple times within a storage system. Even if there are multiple users or entities that separately perform operations to store the same data item, the de-duplication process will operate to store only a limited number of copies of the data item, but allow those multiple users/entities to jointly access the copies that are actually stored within the storage system.

In some embodiments, de-duplication is performed directly on primary storage using the virtualized storage management system. The container abstraction can be used to specify a de-duplication domain, where de-duplication is performed for data stored within the container. Data in different containers is not de-duplicated even if it is the same. A container is assigned one storage pool—this defines the disks where the data for that container will be stored.

vDisks are the virtual storage devices that are exported to user VMs by the Service VMs. As previously discussed, the vDisk is a software abstraction that manages an address space of S bytes where S is the size of the block device. Each service VM might export multiple vDisks. A user VM might access several vDisks. Typically, all the vDisks exported by a service VM are accessed only by the user VMs running on that server node. This means that all iSCSI or NFS requests originating from a user VM can stay local to the hypervisor host—going from the user VM to the hypervisor SCSI emulation layer to a virtual switch to the Service VM. A vDisk is assigned a unique container at creation time. The data in the vDisk is thus managed according to the configuration parameters set on the container.

In some embodiments of the invention, the basic unit of de-duplication is the extent, which is a contiguous portion of storage on a given storage device. Multiple extents can be collected together and stored within an "extent group."

Figure 4:
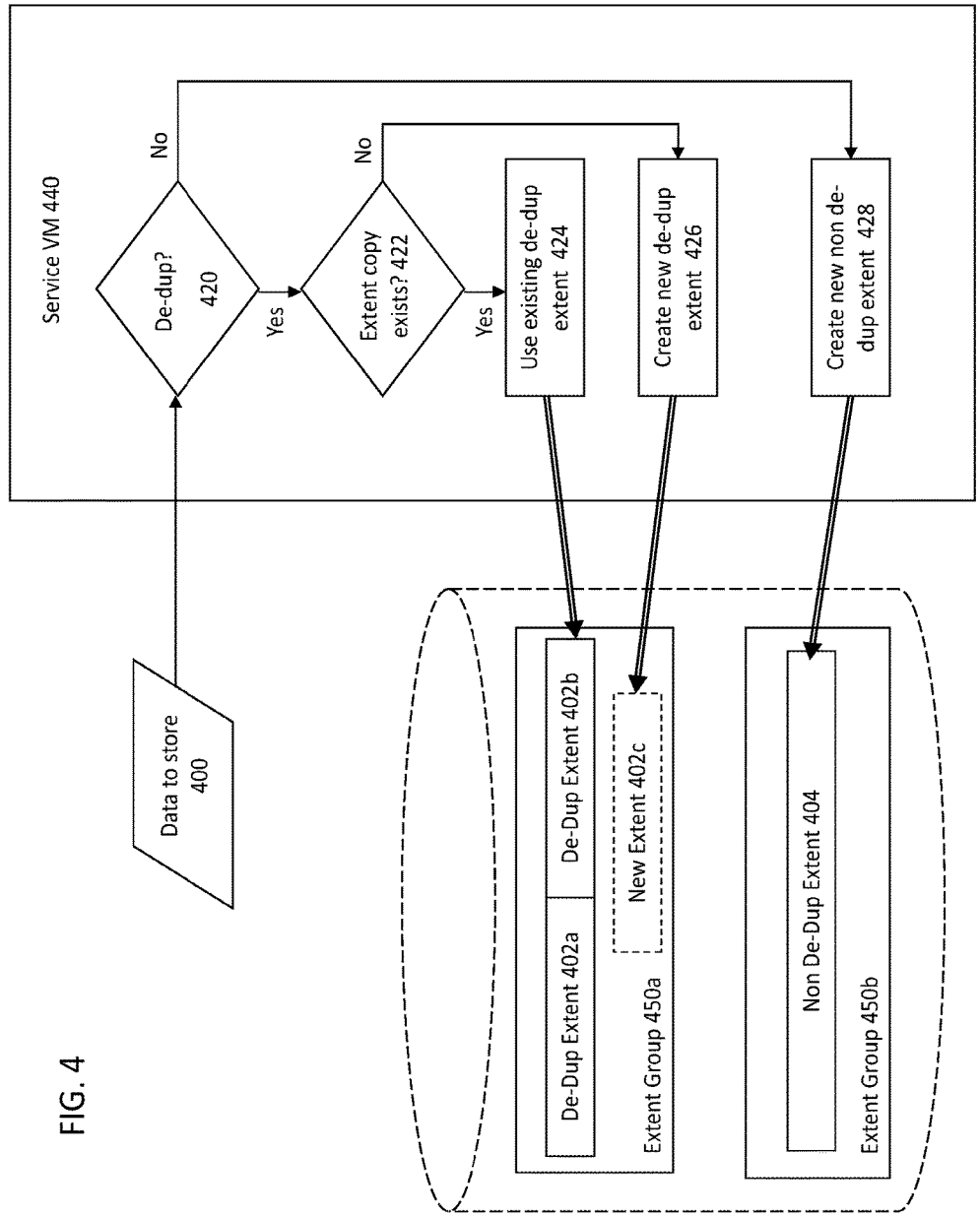
FIG. 4 illustrates an approach for implementing de-duplication according to some embodiments.

The left portion of FIG. 4 illustrates two extent groups 450a and 450b. Extent group 450a includes de-duplication with existing de-duplication extents 402a and 402b. Extent group 450b includes a non-de-duplication extent 404. As described in more detail below, new extents (such as extent 402c) can be added to an existing extent group, e.g. the extent group 750a, if there is sufficient space in the existing extent group.

Assume that a user issues an I/O request to write an item of data 400 to storage. The service VM 440 will perform a process to analyze the data item 400 and assign that data item 400 to an extent for storage. At 420, a determination is made whether de-duplication is desired or enabled. If not, then at 428, a new non-de-duplication extent 404 is created within an appropriate extent group (e.g., extent group 450b) to store the data item 400.

If de-duplication is enabled, then a further determination is made at 422 whether the storage system already includes a copy of that data item. According to some embodiments, this is accomplished by performing "Rabin fingerprinting" upon the data that is being stored. Rabin fingerprinting is a known algorithm for objectively dividing data into consistent portions. This algorithm creates uniform and common boundaries for data portions that are partitioned out of larger items of data. Further details regarding an exemplary approach that can be taken to identify extents for de-duplication are described in co-pending application Ser. No. 13/207,375, which is hereby incorporated by reference in its entirety. The SHA1 algorithm is applied to the data portion created by Rabin fingerprinting to create a unique signature for that data portion. This is a well-known hashing algorithm that takes any set of arbitrary data and creates a 20 byte content-based signature. The SHA1 algorithm creates a value that is used as an extent identifier (extent ID), which is further used to determine if an earlier copy of the data item 400 has already been stored in the storage system.

If a copy already exists, then a new copy of the data item 400 is not stored; instead, the existing copy stored in de-dup extent 402b is used. A "ref_count" (or reference count) for that extent 402b would be incremented to provide notice that a new entity is now relying upon this extent 402b to store the data item 400. However, if a copy of the data item 200 does not yet exist, then a new extent 402c is created to store the data item 400.

The sizes of the extents and extent groups for the invention can be chosen to suit any desired performance goals. In some embodiments, the extent groups are implemented as 64 Mbyte size files. The non-deduplicated extents are created to have a much larger size than the deduplicated extents. For example, the non-deduplicated extents may be implemented with 1 Mbyte sizes and the deduplicated extents implemented with 8 Kbyte sizes. The goal of this sizing strategy is to make the deduplicated extents as small as practical to facilitate duplications while the non-deduplicated extents are made as large as practical to facilitate efficient physical I/O operations and to prevent the metadata (e.g., the number of rows of metadata) from bloating.

Performance Tier De-Duplication

In some systems, wherein a storage container is divided into multiple tiers, higher performance tiers of storage (e.g., RAM and/or flash) are used as a cache, while lower performance tiers of storage (e.g., spinning disk) are used to write and store persistent data. For the purposes of this specification, it is understood that higher performance/lower performance tiers may refer to tiers that are more efficient/less efficient at processing I/O requests from the user VMs. High performance tiers may also be tiers with non-persistent storage devices (e.g., RAM), while low performance tiers may be tiers comprising persistent storage devices (e.g., spinning disk). In some embodiments, high performance tiers may comprise local storage, while low performance tiers may comprise networked or cloud storage. High performance tiers and low performance tiers may also be referred to as caching storage tiers and persistent storage tiers, respectively.

It is often important for efficient reading to keep a hot working set of data in one or more higher tiers of storage (e.g., RAM and/or Flash tiers), but because dozens or even hundreds of user VMs using significant amounts of duplicate data may be supported on a single node, without de-duplication, it is often impossible to effectively fit the working set in the higher performance tiers. On the other hand, storage capacity in the lower performance tiers of often less of a concern. Thus, in some embodiments, in order to increase I/O speeds, the virtualization environment may be configured such that no inline de-duplication is performed during write operations to the lower performance tiers, but is performed on read operations in order to maintain a de-duplicated working set in the higher performance tiers.

Thus, performance tier de-duplication may be used where there is a greater need to keep a de-duplicated hot working set cached in the higher performance tiers (e.g., a RAM tier, Flash tier, and/or SSD tier), but less of a need to ensure constant de-duplication in the lower performance tiers. Performance tier de-duplication involves fingerprinting data during write operations, and de-duplication is performed on the high performing tiers during read operations, with no de-duplication occurring on lower tiers used for persistent storage in some embodiments.

A content cache is used to store the working set data. The content cache contains data structures for mapping fingerprints (e.g., SHA1) to data chunks, and may be implemented on multiple storage tiers, such as a RAM tier and/or a Flash tier. For the purposes of this specification, the contact cache will be assumed to be a two-tiered cache implemented in the RAM and Flash tiers, although it is understood that different storage tiers may be used instead of or in addition to those listed. In some embodiments, one content cache may be maintained per node, to be shared by all user VMs (UVMs) on the node, while in other embodiments, a content cache may be shared by multiple nodes. In some embodiments, the size of the content cache may be configured based on the expected size of an OS image for a VDI environment. For example, if the VDI environment has an expected OS image size of 20 G, 20 G of RAM and Flash space may be reserved on a per node basis for the content cache.

Fingerprinting may be used with a fixed-block scheme or a Rabin or variable length scheme. Because a vDisk generally appears as a block device to the guest file system (user VM's file system) and not a sequential output stream, using a fixed-block scheme may enable more efficient de-duplication. When using a fixed-block scheme, it is important to pick a block size that is the same as the guest file system's block size, or a smaller divisible factor of the guest file system's block size.

In some embodiments, one or more user VMs may be configured to only generate fingerprints for certain types of data, so that not all data subject to I/O requests by the user VMs is fingerprinted. A separate extent cache may be used to cache the non-fingerprinted data, while fingerprinted data is cached with the content cache.

Figure 5:
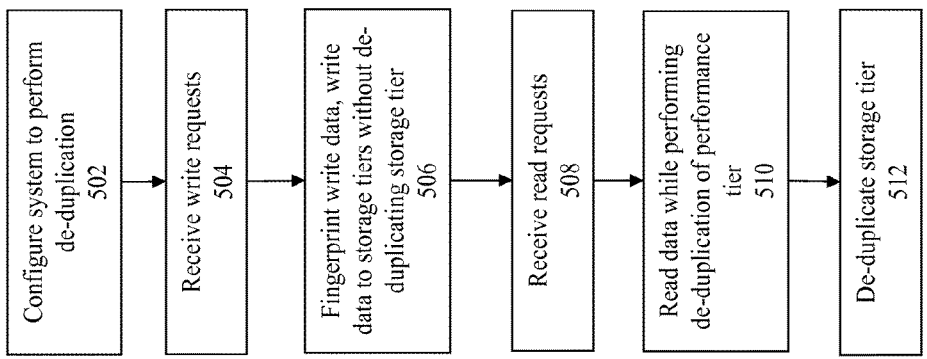
FIG. 5 illustrates an approach for performing performance tier de-duplication in accordance with some embodiments.

FIG. 5 illustrates a flowchart of a method for performing performance tier de-duplication in accordance with some embodiments. At 502, the system is configured to perform de-duplication (e.g., by selecting an appropriate system setting).

At 504, the system receives one or more write requests. At 506, fingerprints are generated for the data to be written, and the data is written to the persistent storage tier regardless of whether or not the persistent storage tier already contains copies of the data. In other words, no de-duplication of the storage tier is performed when handling the write requests.

At 508, one or more read requests are received. At 510, data is read to satisfy the read requests. This may comprise reading the data from the caching storage tier (if the data exists in the caching storage tier) or from the persistent storage tier. In addition, de-duplication may be performed on the caching storage tier based at least in part upon generated fingerprints for the data, in order to ensure that the caching storage tier does not contain more than one copy of a particular piece of data.

At 512, de-duplication may be performed on the persistent storage tier at a later time. The de-duplication is not performed in response to any particular read or write request. For example, in some embodiments the de-duplication may be a periodic batch or garbage collecting process. Performing de-duplication on the persistent storage tiers results in the persistent storage tiers not containing more than a specified number of copies of the same data.

In some embodiments, more than one copy of data may be stored in the persistent storage tier. For example, in order to provide a degree of redundancy in the case of failure or data corruption, a system may be configured to store more than one copy of data in its persistent storage tier. How many copies of the same data allowed to be stored in the persistent storage tier may be based upon a replication factor for the system. Thus, de-duplication of the persistent storage tiers may be configured such that the number of copies of the same piece of data in the persistent storage tier will not exceed a number associated with the replication factor of the system.

Figure 6A:
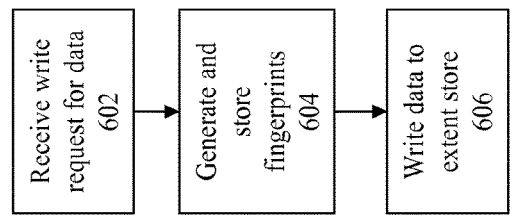
FIG. 6A illustrates an approach for implementing a write request in accordance with some embodiments.

FIG. 6A illustrates a flowchart for a write operation in accordance with some embodiments implementing performance tier de-duplication. At 602, a service VM receives a request to write data to its associated vDisk from a UVM. The write request comprises the data to be written, a vDisk to be written to, and a vDisk offset corresponding to a location on the vDisk for which to write the data. A service VM may process the write request using a vDisk map in metadata to identify an extent group and/or extent ID.

At 604, fingerprints are generated for the data to be written. The fingerprints (e.g., using Rabin fingerprinting, SHA1) may be computed for chunks of data of a predefined size (e.g., 4 k chunks). The fingerprints are then stored to metadata and associated with the vDisk location of the user VM, and may be stored along with one or more checksums. In some embodiments, only sequential writes are fingerprinted.

Thus, the metadata will, in addition to mapping vDisk locations to extents on physical storage, associate vDisk locations with fingerprints corresponding to the data stored at those locations. During later read operations, fingerprints for the data to be read can therefore be identified and retrieved before any extent stores need to be accessed.

At 606, the service VM writes the data to physical storage in the lower persistent storage tiers (the extent store). In some embodiments, no de-duplication is performed during the write operation, and thus it is possible for multiple copies of the same data to be written by different UVMs to the lower storage tiers. This may be used to increase the speed of write operations in systems where storage space on the lower storage tiers is less of a concern, due to not having to performing any de-duplication processing during the write operation.

In some embodiments, the data may also be written into a content cached located on one or more high performance tiers, based upon the particular caching scheme of the virtualization environment. For example, in some embodiments, a determination may be made as to whether the data to be written is expected to be read frequently. If so, the data may be written to a content cache as part of the write operation. In some embodiments, prior to writing data to the content cache, the content cache is first checked to see if it already contains data having fingerprints matching those of the data to be written.

Figure 6B:
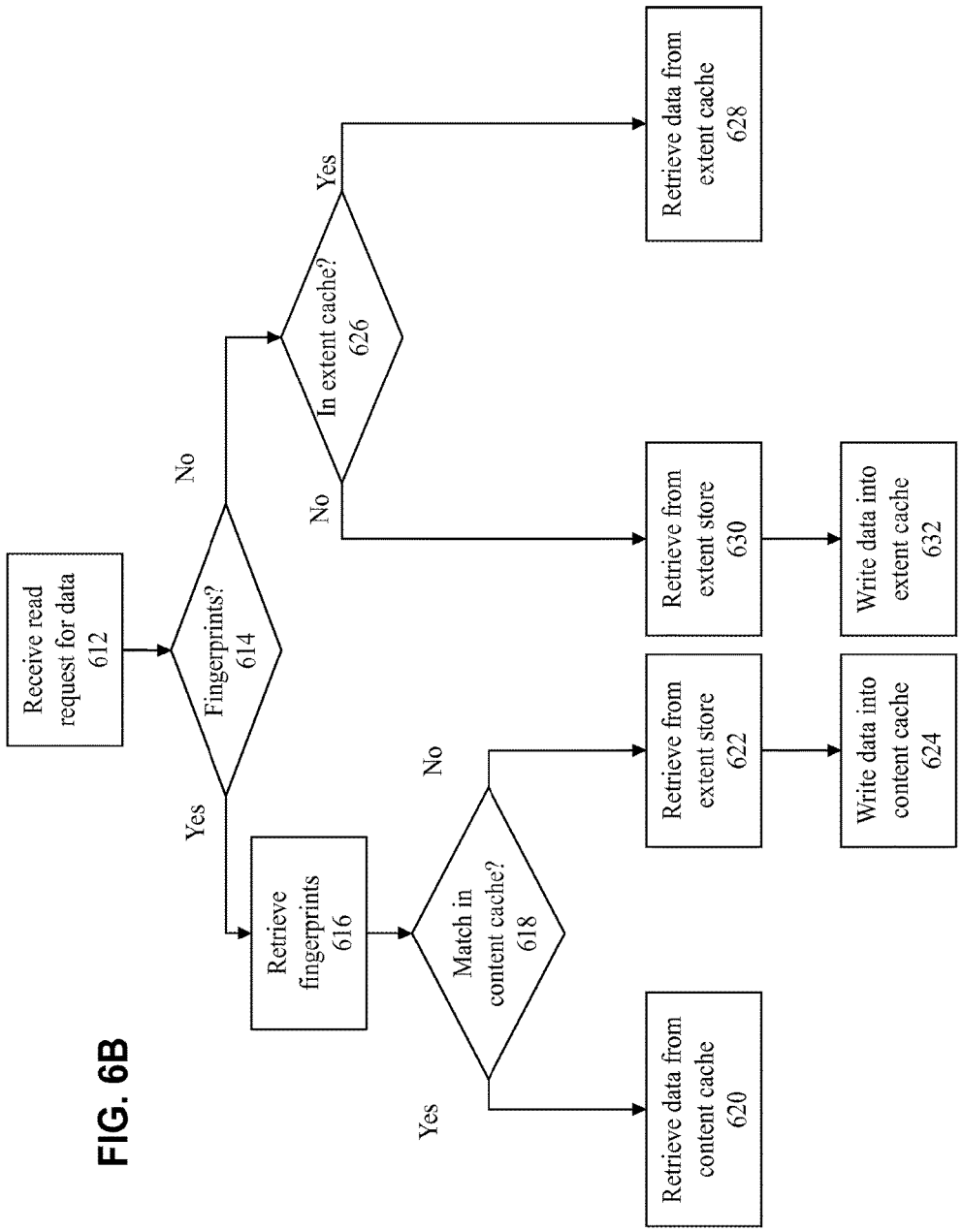
FIG. 6B illustrates an approach for implementing a read request in accordance with some embodiments.

FIG. 6B illustrates a flowchart for a read operation in accordance with some embodiments implementing performance tier de-duplication. At 612, a request to read data from the vDisk for one or more user VMs is received. The request contains a vDisk address that may comprise a vDisk name and vDisk offset corresponding to the data to be read.

At 614, a determination may be made as to whether any of the requested data is associated with one or more fingerprints. If the data does have fingerprints, then at 616, the fingerprints associated with the requested data at the vDisk address are identified and retrieved. In some embodiments, this is done by looking up the fingerprint data associated with the vDisk and vDisk offset specified in the read command.

At 618, the identified fingerprints are matched against the fingerprints of the data stored in the content cache. If a fingerprint match is found, it indicates that the requested data may be found in the content cache, and the matching data will be retrieved from the content cache at 620. However, if no match is found, then the content cache does not contain a copy of the data, and the data is instead retrieved from the extent store in the lower performance tiers at 622. In some embodiments, when data is retrieved from the extent store, a copy is placed into the content cache at 624, depending upon the particular caching scheme of the virtualization environment.

Because matching is done in the content cache using fingerprints and not storage location, a single piece of data in the content cache may correspond to multiple pieces of data written to different locations of a vDisk or on different vDisks for different user VMs. Thus, even though instances of the same data may be duplicated in the lower storage tiers, only one instance of the data will be read into the content cache, even if it is requested to be read by different user VMs from different vDisks, resulting in de-duplication of data in the content cache during read requests.

On the other hand, if the system uses an extent cache, and the requested data does not have any associated fingerprints, the extent cache may be checked at 626 to see whether it contains the requested data. In some embodiments, the extent cache may be checked first before determining of the requested data has any associated fingerprints. If the requested data is found within the extent cache, then it is retrieved from the extent cache at 628. If the requested data is not found in the extent cache and does not have fingerprints, then the requested data is retrieved from the extent store in the lower performance tiers at 630 (e.g., spinning disk tier). In some embodiments, when data is retrieved from the extent store, a copy is placed into the extent cache at 632.

In some embodiments, a batch operation may be later performed to implement de-duplication of data on the lower storage tiers. This may be done in order to take advantage of efficiencies associated with batching operations, as opposed to having to perform de-duplication in response to or near the times of individual write requests. Thus, the performing of de-duplication on the persistent storage tiers is not tied to any particular write or read request. Instead, de-duplication of the persistent storage tiers may be configured to be performed periodically, during periods of low activity, or at any other time considered opportune.

FIGS. 7A-7D illustrate an example of performance tier de-duplication in accordance with some embodiments. In some embodiments, multiple user VMs (e.g., a first UVM 701 and a second UVM 702) are managed by a service VM 704, which processes read and write requests by the UVMs to storage 706. Storage 706 comprises persistent storage 710 implemented in one or more storage tiers (typically lower performance storage tiers), and cache 708 implemented in one or more storage tiers (typically higher performance storage tiers). Persistent storage 710 contains storage devices corresponding to one or more vDisks (e.g., a first vDisk 712 and a second vDisk 714). For the purposes of this example, it is assumed that all data will have associated fingerprints, while in some embodiments, as described above, some data may have associated fingerprints, while other data may not have fingerprints.

Figure 7A:
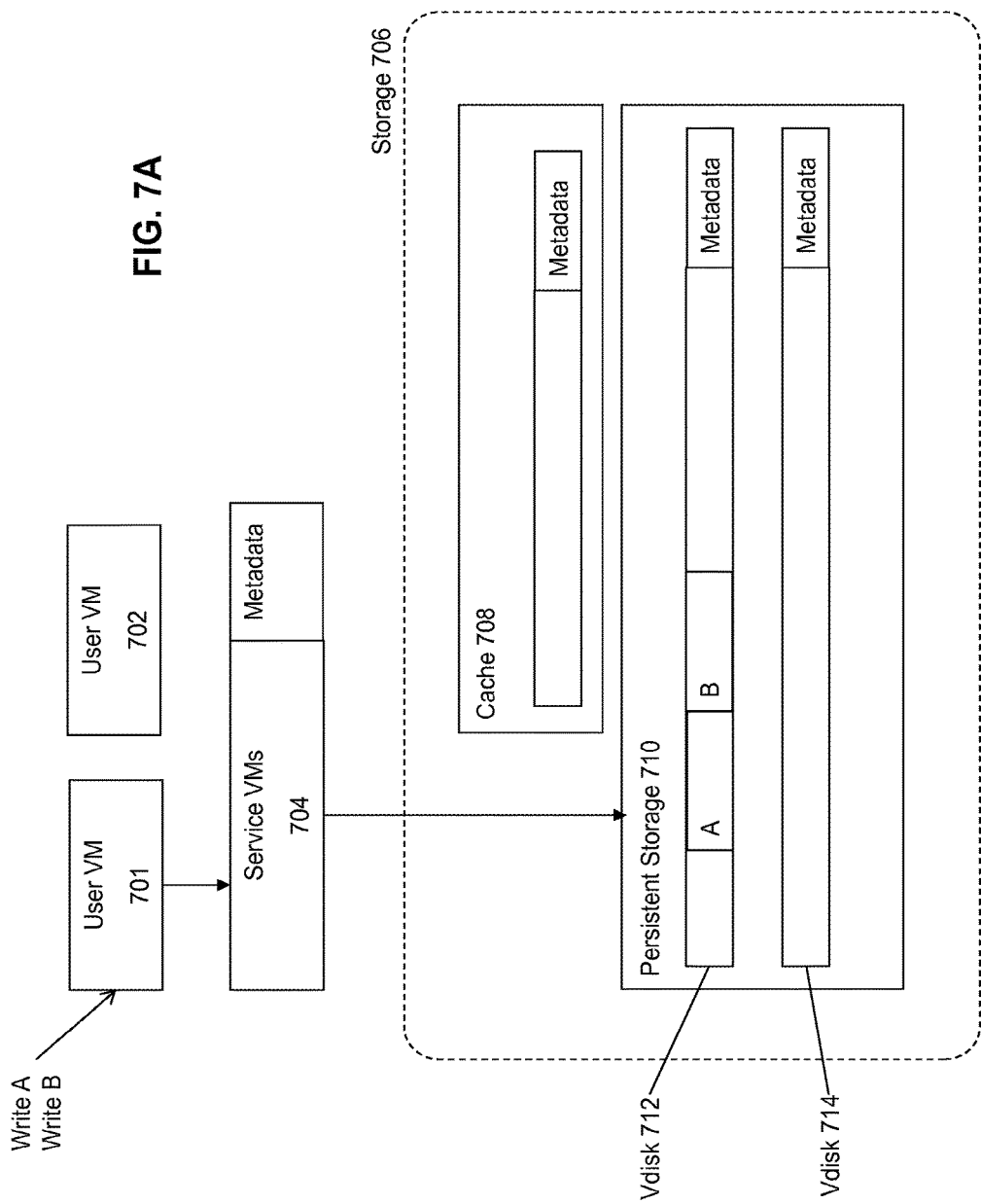

In FIG. 7A, UVM 701 receives a write request to write Data A and Data B to particular locations on vDisk 712. The request is sent to service VM 704, which writes the data to the specified locations on persistent storage 710. In addition, service VM 704 stores metadata that maps the vDisk location of the stored data to the actual physical location of the data. One or more fingerprints are calculated for the data, and stored with the metadata on service VM 704. Therefore, after the write request from UVM 701 has been completed, Data A and Data B have been to written to the specified locations on vDisk 712, and fingerprints for Data A and Data B have been calculated and associated with their respective locations as defined in the metadata of service VM 704.

In FIG. 7B, UVM 702 receives a write request to write Data A to a location on vDisk 714. The request is sent to service VM 704, which writes the data to the specified location on persistent storage 710. In addition, service VM 704 stores metadata for the vDisk location, including fingerprint data for the vDisk location. Thus, at the completion of the write request, Data A has been written to two locations on persistent storage 710, and the fingerprints for Data A are associated with two different vDisk locations in the metadata of service VM 704, while Data B has been written to one location, with the fingerprints for Data B associated with its vDisk location in the meta data of service VM 704. In order to differentiate the Data A written in two different locations, the two copies of Data A in the persistent storage tiers are labelled Data A1 and Data A2.

Figure 7C:
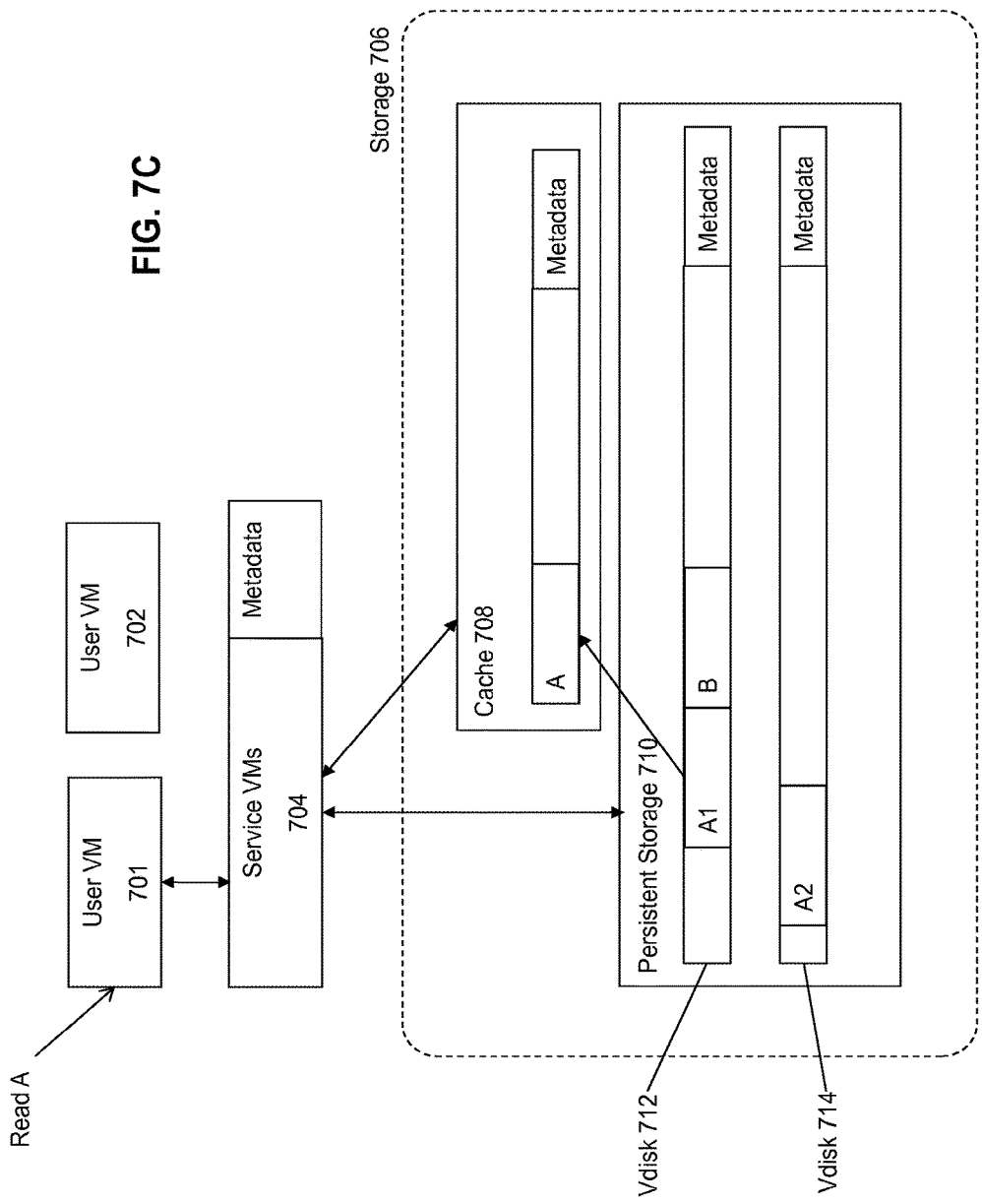

In FIG. 7C, UVM 701 receives a read request to read the data located at on vDisk 712 corresponding to the previously-written Data A1. Service VM 704 receives the request and identifies the fingerprints associated with the particular location on vDisk 712 (i.e., the fingerprints for Data A). Service VM 704 may then then check content cache 708 if any data in the cache is associated with matching fingerprints. However, because there is currently no data in cache 708, service VM 704 retrieves the data from persistent storage 710 and returns it to UVM 701. Service VM 704 may also write a copy of the read data to cache 708, along with its associated fingerprints. Thus at the completion of the read request, a copy of Data A and its associated fingerprints are stored in cache 708.

Figure 7D:
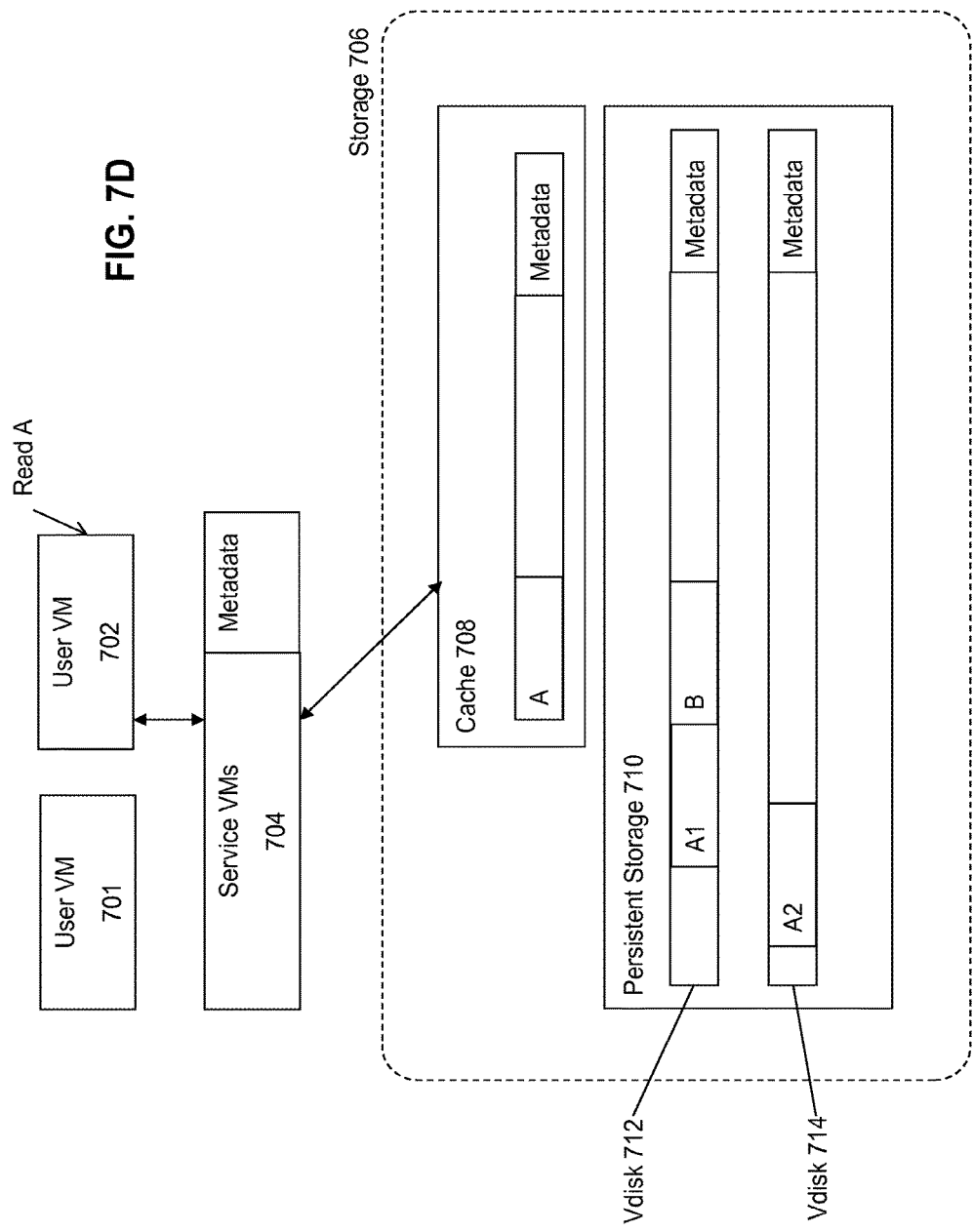

In FIG. 7D, UVM 702 receives a read request to read the data located on vDisk 714 corresponding to the previously-written Data A2. Service VM 704 receives the request, and identified the fingerprints associated with the data and the particular location on vDisk 714 (i.e., the fingerprints for Data A). Service VM 704 then checks the content cache 708 to see if any data in the cache is associated with fingerprints that match the retrieved fingerprints. Because Data A and its associated fingerprints are stored in cache 708, Service VM 704 retrieves Data A directly from cache 708, without having to go to persistent storage 710. Thus, it can be seen that even though there may be multiple copies of Data A in persistent storage 710 (e.g., Data A1 and Data A2), only one copy is stored in cache 708, which can be used to satisfy all requests for Data A, regardless of the specific copy of Data A in persistent storage 710 they are directed to, or of the specific UVM making the request.

In addition, for each piece of data written, fingerprints only need to be calculated once (during the write request) and then stored for subsequent use. For example, even if UVM 701 is moved to a different node with a different Service VM (not shown), it does not have to recalculate any fingerprint data.

In some embodiments, persistent storage tiers may be maintained on a global basis for a plurality of different nodes, while cache tiers are maintained on a per node basis. In some embodiments, different de-duplication schemes may be used for different tiers of storage, based upon performance, coverage, or any other relevant factor.

Although the above embodiment are directed to a virtualization environment having two tiers for storage (a high performance caching tier and a persistent storage tier), it is understood that in other embodiments, a virtualization environment may contain any number of tiers. For example, in some embodiments, a virtualization environment may have a low performance tier comprising hard disks and/or other persistent storage devices, a middle performance tier comprising SSDs, and a high performance tier comprising RAM and/or Flash memory. Each tier may perform de-duplication on a different schedule. For instance, in the above example, the high performance tier may be de-duplicated in response to read and/or write commands, while the middle and low performance tiers are de-duplicated at different intervals.

In some embodiments, different types of fingerprints may be calculated for the stored data. For example, the different types of fingerprints may include a first type of fingerprint that is inexpensive to calculate, but also relatively imprecise (e.g., different pieces of different data may have the same fingerprint), and a second type of fingerprint that is more expensive to calculate, but also more precise. For example, the first type of fingerprint may be a 32-bit fingerprint, while the second type of fingerprint may be a 256-bit fingerprint. The first and second types of fingerprints may hereinafter be referred to as first fingerprints and second fingerprints, respectively. In some embodiments, a first fingerprint is calculated in response to data being written to a storage tier during a write request, while a second fingerprint may be calculated at a later point in time to be used for de-duplication of the caching tiers, allowing for more efficient reads and writes.

FIG. 8 illustrates a flowchart of a method for performing de-duplication using first and second fingerprints in accordance with some embodiments. At 802, a request to write data to an associated vDisk is received. The write request may comprise the data to be written, a vDisk to be written to, and a vDisk offset corresponding to a location on the vDisk for which to write the data. A service VM may process the write request using a vDisk map in metadata to identify an extent group and/or extent ID.

At 804, first fingerprints are generated for the data to be written, which may be then stored to metadata and associated with the vDisk location of the user VM. Thus, every piece of data that is written will have associated first fingerprints. At 806, the generated first fingerprints are checked against the first fingerprints associated with previously stored data, to see if there is a match. If there is no match, then it is determined that the extent store does not already contain a copy of the data, and the data is written into the extent store at 808.

However, if a match of the first fingerprints is found, then at 810 the data in the extent store corresponding to the matched fingerprints is read, so that it can be compared with the data to be written at 812. This is because the first fingerprint is relatively imprecise, so although it can be determined that two pieces of data having different first fingerprints will not correspond to the same data, it cannot be determined with certainty that two pieces of data having matching first fingerprints are the same data.

In some embodiments, the comparison may be performed by generating second fingerprints for the data to be written and, if they do not already exist, for the data read from the extent store, and comparing the respective second fingerprints. Other methods for comparing the data may also be used. If there is no match, then it is determined that the data to be written is different from the previously stored data, and thus is written to the extent store at 814. However, if a match is found, then, at 816, the data is not stored. Instead, the vDisk location of the write request may be mapped to the extent store location of the matched data. In some embodiments, if the system has a replication factor that allows for multiple copies of data to be stored, the data may be stored if the number of copies of the data already in storage is found to not exceed the maximum allowed number of copies.

This method thus allows for de-duplication of the storage tiers to be performed in response to write requests, but has the advantage of not always having to calculate an expensive second fingerprint during the write request. This allows the request to be processed more quickly and efficiently. Instead, the second fingerprint may be calculated at a later time, such as through a periodic process that calculates second fingerprints for all stored data for which second fingerprints do not already exist. The second fingerprints may then be used to perform de-duplication of the content cache during read requests in the manner described above.

Cache Structure

Figure 9:
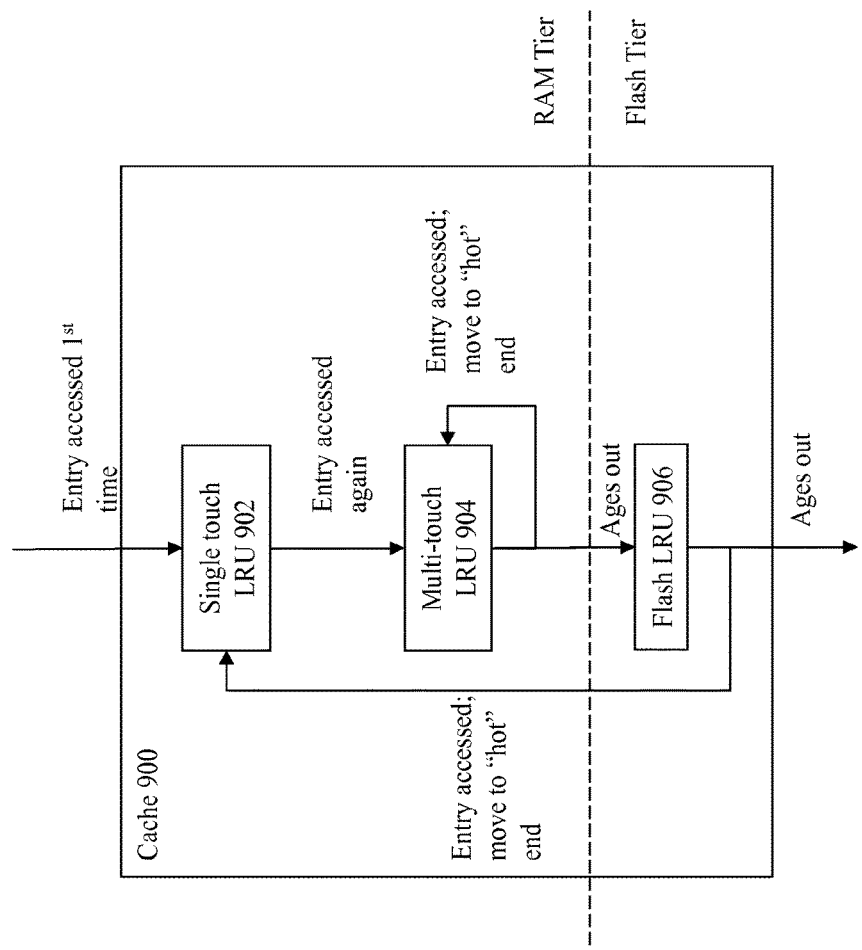
FIG. 9 illustrates a content cache in accordance with some embodiments.

FIG. 9 illustrates a content cache 900 in accordance with some embodiments. In some embodiments, the content cache may be divided into multiple tiers, such as a primary tier (e.g., RAM) and a secondary tier (e.g., Flash). The data may be stored on either tier depending on its "hotness," or how often it has been accessed by a VM user in a certain period of time. For example, the hotter or more recently accessed data may be stored on the higher performance tiers (e.g., RAM) of the content cache, while less hot data may be found on lower performance tiers (e.g., Flash). Size of each tier may be configured via parameters such as stargate_content_cache_max_flash and stargate_content_cache_max_memory.

In some embodiments, the data structures used by the content cache are based in the RAM tier, even though the data itself may be in either the RAM or Flash tiers. The data stored in the content cache may be stored using a hash table, wherein each data entry of the hash table contains a hash key and a hash value. Hash table keys may be the SHA1 fingerprints for the data entry, whereas hash table values may be either the data chunk associated with the entry (if stored in the RAM portion of the content cache) or pointers to the data chunk (if stored in the Flash portion of the content cache). In other embodiments, fingerprints may be kept on the flash tier instead of the RAM tier so that it does not age or require re-computation in the event of a reset or restart.

The data entries in the content cache may also be organized into one or more buffers or LRU (least recently used) chains, to keep track of which data has been most recently accessed by a user VM, with the most recently accessed data on the "hot" end of the LRU chain. The LRU chains may also "age out" data that is left in the content cache for too long without being accessed by a user VM, or to make room for new data being written to the content cache. In some embodiments, the LRU chains may be implemented as a doubly-linked list. Each LRU chain may have a limit as to how much of the content cache that the data entries in the particular LRU chain may occupy. These limits may be either hard limits or soft limits, where they are only enforced on an LRU chain if another LRU chain exceeds its quota.

As illustrated in FIG. 9, content cache 900 may comprise a single-touch LRU 902, a multi-touch LRU 904, and/or an on-flash LRU 906. When a data entry is first brought into the content cache 900 from the lower storage tiers, it is written into the single-touch LRU 902. When a data entry is aged out of the single-touch LRU 902, it is removed from the content cache 900.

In some embodiments, single-touch LRU 902 is allocated a limit of 20% of the total content ache memory. This limit may be a soft limit that is only enforced when the multi-touch LRU 804 exceeds its quota. The use of a single touch LRU 902 helps to provide "scan resistance" in the content cache, preventing a scanning operation that requests many different pieces of data once each, such as a virus scan, from replacing the entire contents of the content cache 900.

When a data entry already in the single-touch LRU 902 is accessed again by a user VM, it is re-assigned to the "hot" end of the multi-touch LRU 904. Subsequent accesses while the data is part of the multi-touch LRU 904 will move the data entry from its position in the LRU back to the "hot" end of the multi-touch LRU 904. In some embodiments, a plurality of multi-touch LRU chains may be used. In such embodiments, a data entry moves to a higher multi-touch LRU when accessed by a virtual machine but is moved to a lower multi-touch LRU is not accessed in a certain time period.

In some embodiments, when a data entry on the multi-touch LRU 904 ages out or is otherwise replaced, instead of being removed from content cache 900, it is moved to the on-Flash LRU 906. This may also involve writing the data chunk from RAM to Flash, or changing the data entry so that it points to the existing data chunk in the Flash tier, where the data is already present on the Flash.

When a data entry is accessed from the Flash tier, the data may be read from Flash tier back into the RAM tier, and its entry may be moved to the "hot" end of the single-touch LRU chain 902. Additionally, a copy of the data may also remain in the Flash tier, and keep its position in the Flash LRU chain. When a copy of the data remains in the Flash tier, cached data may be duplicated between different tiers, but de-duplicated within the same tier. Alternatively, the data may be removed from Flash when it is written back into RAM.

In some embodiments, a flash allocator may be used to allocate space on the flash tier. An instance of the flash allocator may be given a certain amount of flash space, and is instantiated for a particular size of allocations (e.g., 4 k). The instance may keep its data on an ext4 file, and maintain a nextFreeOffset parameter. The nextFreeOffset parameter may start at an offset of 0 in the file, signifying that the entire file is free. When allocation requests are received, they may be satisfied by returning nextFreeOffset and bumping it up by the allocation size. As allocated areas in the Flash are freed, a singly-linked free list may be used to maintain the free offsets. The singly-linked list may be stored in the RAM tier despite the data being on the Flash tier.

Various metrics may be maintained by the system. These may include a percentage of data identified as sequential and fingerprinted (e.g., with SHA1), hit/miss percentages of the extent cache, and hit/miss percentages of the content cache (globally and/or for each LRU pool). Metrics may also include a number of hits per entry in the content cache, and a number of ref_count per entry in the content cache. These metrics may be represented as a histogram, and averages may be calculated. In some embodiments, it may not be necessary to maintain a ref_count for data entries stored in the content cache, as data entries will simply age out of the cache if not requested by any user VMs.

Additional metrics may include latency of an extent cache hit, latency of a content cache hit (in memory and/or on flash), de-duplication effectiveness (ref_count times size of entry read), and CPU costs with de-duplication and without de-duplication.

In some embodiments, the extent cache may be a RAM tier only cache. In other embodiments, the extent cache may leverage the flash allocator and be implemented in flash. In other embodiments, the flash may be used as an OPLog (to absorb writes).

Therefore, what has been described is an improved architecture for implementing performance tier de-duplication. According to some embodiments, fingerprints are calculated during write operations, but no de-duplication is performed. Instead, de-duplication is performed when reading data to maintain a content cache in the higher performance tiers of storage free from duplicated data.

System Architecture

Figure 10:
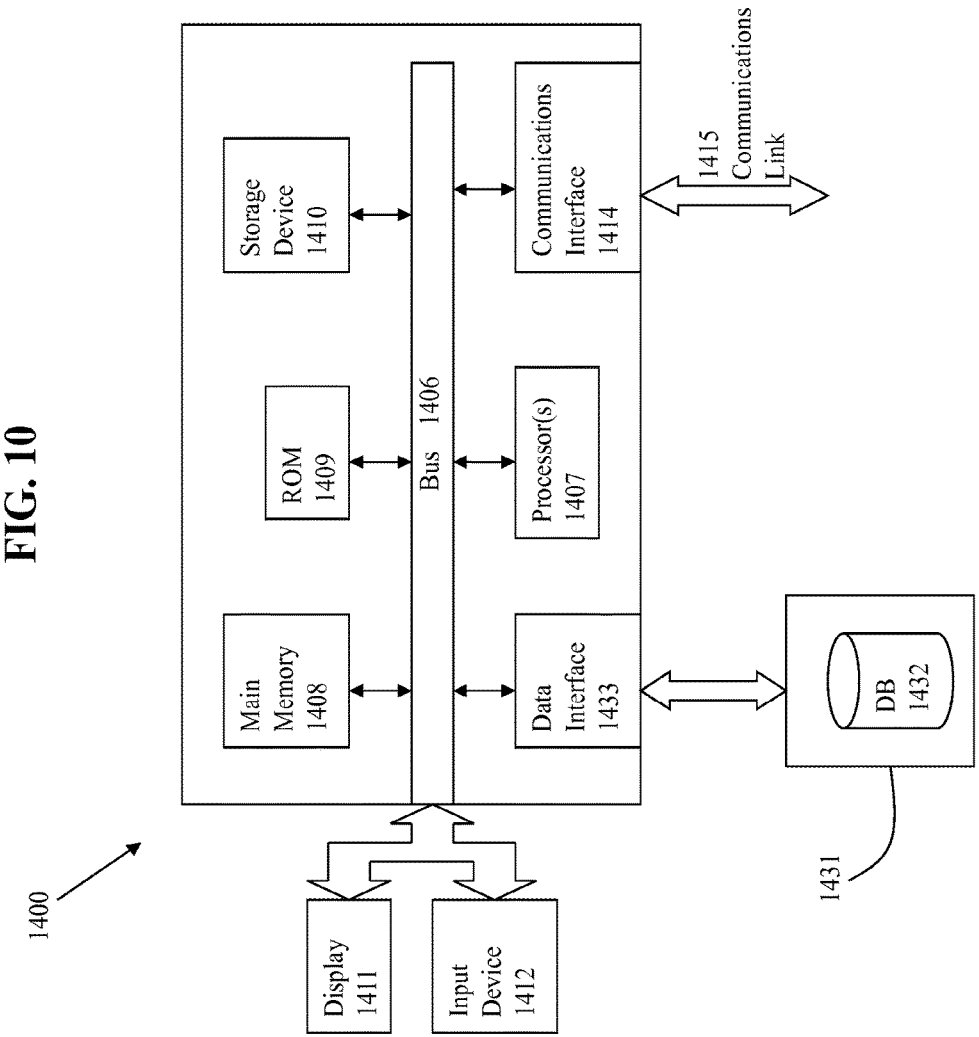
FIG. 10 is a block diagram of a computing system suitable for implementing an embodiment of the present invention.

FIG. 10 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer-implemented method for de-duplication, comprising:
   receiving a read request from one or more virtual machines to read at least a portion of data;
   identifying fingerprints corresponding to the portion of data to be read;
   accessing a content cache that stores a set of data for the one or more virtual machines and fingerprints corresponding to the cached set of data, wherein the content cache is configured such that it does not store more than one copy of data corresponding to a particular fingerprint;
   determining if any of the identified fingerprints corresponding to the portion of data being requested match any of the fingerprints corresponding to the cached set of data;
   if a match is found, retrieving data corresponding to the matched fingerprints from the cached set of data; and
   if a match is not found, retrieving the portion of data from an extent store and writing a copy of the portion of data into the content cache, wherein the extent store is a persistent storage device associated with one or more virtual disks.

2. The computer-implemented method of claim 1, wherein the fingerprints comprise SHA1 fingerprints.

3. The computer-implemented method of claim 1, wherein the fingerprints are associated with locations on the one or more virtual disks.

4. The computer-implemented method of claim 1, wherein the content cache is implemented in RAM or flash.

5. The computer-implemented method of claim 1, wherein the content cache associates fingerprints with working set of data using a hash table.

6. The computer-implemented method of claim 1, wherein the content cache comprises one or more LRU chains.

7. The computer-implemented method of claim 6, wherein the LRU chains comprise a single-touch LRU chain and a multi-touch LRU chain.

8. A system for de-duplication in a virtualization environment, comprising:
   a processor;
   a memory comprising computer code executed using the processor, in which the computer code implements:
   receiving a read request from one or more virtual machines to read at least a portion of data;
   identifying fingerprints corresponding to the portion of data to be read;
   accessing a content cache that stores a set of data for the one or more virtual machines and fingerprints corresponding to the cached set of data, wherein the content cache is configured such that it does not store more than one copy of data corresponding to a particular fingerprint;
   determining if any of the identified fingerprints corresponding to the portion of data being requested match any of the fingerprints corresponding to the cached set of data;
   if a match is found, retrieving data corresponding to the matched fingerprints from the cached set of data; and
   if a match is not found, retrieving the portion of data from an extent store and writing a copy of the portion of data into the content cache, wherein the extent store is a persistent storage device associated with one or more virtual disks.

9. The system of claim 8, wherein the fingerprints comprise SHA1 fingerprints.

10. The system of claim 8, wherein the fingerprints are associated with locations on the one or more virtual disks.

11. The system of claim 8, wherein the content cache is implemented in RAM or flash.

12. The system of claim 8, wherein the content cache associates fingerprints with working set of data using a hash table.

13. The system of claim 8, wherein the content cache comprises one or more LRU chains.

14. The system of claim 13, wherein the LRU chains comprise a single-touch LRU chain and a multi-touch LRU chain.

15. A computer program product embodied on a non-transitory computer readable medium, the computer readable medium having stored thereon a sequence of instructions which, when executed by a processor causes the processor to execute a method for de-duplication in a virtualization environment, the method comprising:
   receiving a read request from one or more virtual machines to read at least a portion of data;

identifying fingerprints corresponding to the portion of data to be read;

accessing a content cache that stores a set of data for the one or more virtual machines and fingerprints corresponding to the cached set of data, wherein the content cache is configured such that it does not store more than one copy of data corresponding to a particular fingerprint;

determining if any of the identified fingerprints corresponding to the portion of data being requested match any of the fingerprints corresponding to the cached set of data;

if a match is found, retrieving data corresponding to the matched fingerprints from the cached set of data; and if a match is not found, retrieving the portion of data from an extent store and writing a copy of the portion of data into the content cache, wherein the extent store is a persistent storage device associated with one or more virtual disks.

16. The computer program product of claim 15, wherein the fingerprints comprise SHA1 fingerprints.

17. The computer program product of claim 15, wherein the fingerprints are associated with locations on the one or more virtual disks.

18. The computer program product of claim 15, wherein the content cache is implemented in RAM or flash.

19. The computer program product of claim 15, wherein the content cache associates fingerprints with working set of data using a hash table.

20. The computer program product of claim 15, wherein the content cache comprises one or more LRU chains.

21. The computer program product of claim 20, wherein the LRU chains comprise a single-touch LRU chain and a multi-touch LRU chain.

* * * * *